(12) United States Patent
Sumi et al.

(10) Patent No.: US 8,567,972 B2
(45) Date of Patent: Oct. 29, 2013

(54) VEHICLE MIRROR APPARATUS

(75) Inventors: Isao Sumi, Aichi-ken (JP); Nobuhiro Kudo, Aichi-ken (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 90 days.

(21) Appl. No.: 13/298,805

(22) Filed: Nov. 17, 2011

(65) Prior Publication Data

US 2012/0134037 A1    May 31, 2012

(30) Foreign Application Priority Data

Nov. 30, 2010 (JP) ................................. 2010-267554

(51) Int. Cl.
*G02B 7/182* (2006.01)

(52) U.S. Cl.
USPC ......................................................... 359/877

(58) Field of Classification Search
USPC .......................... 359/841, 872, 873, 874, 877; 248/477–479; 200/405
See application file for complete search history.

(56) References Cited

U.S. PATENT DOCUMENTS 7,847,205 B2 * 12/2010 Brouwer et al. .............. 200/405

FOREIGN PATENT DOCUMENTS

| JP | 2002067801 A | 3/2002 |
| JP | 2006088788 A | 4/2006 |
| WO | 2006040799 A1 | 4/2006 |

\* cited by examiner

*Primary Examiner* — Euncha Cherry (74) *Attorney, Agent, or Firm* — Roberts Mlotkowski Safran & Cole P.C.

(57) ABSTRACT

There is provided a vehicle mirror apparatus including: a mirror provided to a vehicle; a worm gear rotated by driving force from a base end side of the worm gear; a wheel gear engaged with the worm gear, the wheel gear adjusting a mirror-face angle of the mirror by being rotated due to the worm gear rotating; and a radial direction stopper portion that stops radial direction displacement of the worm gear towards the wheel gear radial direction outside by the leading end side of the worm gear making contact with the radial direction stopper portion.

8 Claims, 8 Drawing Sheets

VEHICLE MIRROR APPARATUS

CROSS-REFERENCE TO RELATED APPLICATION

This application claims priority under 35 USC 119 from Japanese Patent Application No. 2010-267554 filed Nov. 30, 2010, the disclosure of which is incorporated by reference herein.

BACKGROUND

1. Technical Field

The present invention is related to a vehicle mirror apparatus in which the mirror-face angle of a mirror is adjusted by a worm gear being rotated to rotate a wheel gear.

2. Related Art

In a mirror-face adjusting actuator described in Japanese Patent Application Laid-Open (JP-A) No. 2006-88788, a worm gear is connected to the rotation shaft of a motor, the worm gear is meshed with a worm wheel, and the worm wheel is rotated by rotating the worm gear using motor driving force, thereby tilting a side mirror. The mirror-face angle of the side mirror is accordingly adjusted.

However, with the mirror-face adjusting actuator, and in particular in circumstances in which tilting of the side mirror is stopped and rotation of the worm wheel is in a stopped state, the worm gear greatly displaces in the radial direction towards the worm wheel radial direction outside when rotation force due to driving force of the motor acts on the worm gear. This leads to the possibility of operation noise of the mirror-face adjusting actuator getting louder when the meshing depth of the worm gear with the worm wheel changes greatly.

SUMMARY

In consideration of the above circumstance the present invention is directed towards a vehicle mirror apparatus capable of suppressing operation noise from getting louder.

The first aspect of the present invention provides a vehicle mirror apparatus including:
a mirror provided to a vehicle;
a worm gear rotated by driving force from a base end side of the worm gear;
a wheel gear engaged with the worm gear, the wheel gear adjusting a mirror-face angle of the mirror by being rotated due to the worm gear rotating; and
a radial direction stopper portion that stops radial direction displacement of the worm gear towards the wheel gear radial direction outside by the leading end side of the worm gear making contact with the radial direction stopper portion.

The second aspect of the present invention provides the vehicle mirror apparatus of the first aspect, wherein
the radial direction stopper portion permits radial direction displacement of the worm gear towards the wheel gear radial direction outside, and
the radial direction stopper portion maintains engagement of the worm gear to the wheel gear by stopping radial direction displacement of the worm gear towards the wheel gear radial direction outside.

The third aspect of the present invention provides the vehicle mirror apparatus of the first aspect, further comprising an axial direction stopper portion that stops displacement of the worm gear in the axial direction by the leading end side of the worm gear making contact with the axial direction stopper portion.

The fourth aspect of the present invention provides the vehicle mirror apparatus of the third aspect, wherein the radial direction stopper portion and the axial direction stopper portion are integrated together.

The fifth aspect of the present invention provides the vehicle mirror apparatus of the third aspect, further comprising a suppressing portion that is provided on at least one of the face of the worm gear on the axial direction stopper portion side and the face of the axial direction stopper portion on the worm gear side, and is configured such that when the worm gear has made contact with the axial direction stopper portion the suppressing portion causes suppressing force to act to suppress radial direction displacement of the worm gear.

The sixth aspect of the present invention provides the vehicle mirror apparatus of the first aspect, wherein
pluralities of the worm gears, the wheel gears and the radial direction stopper portions are provided, and
the vehicle mirror apparatus further comprising a plurality of connection portions that connect together the plurality of radial direction stopper portions.

In the vehicle mirror apparatus of the first aspect of the present invention, the worm gear is engaged by the wheel gear, and the wheel gear adjusts the mirror-face angle of the mirror by the wheel gear being rotated due to driving force from the base end side of the worm gear rotating the worm gear.

In this aspect, the radial direction stopper portion stops radial direction displacement of the worm gear towards the wheel gear radial direction outside by the leading end side of the worm gear making contact with the radial direction stopper portion. Consequently, radial direction displacement of the worm gear towards the wheel gear radial direction outside can be suppressed, the meshing depth of the worm gear to the wheel gear can be suppressed from varying, and operation noise can be suppressed from getting louder.

In the vehicle mirror apparatus of the second aspect of the present invention, the radial direction stopper portion permits some radial direction displacement of the worm gear towards the wheel gear radial direction outside. Rotation of the worm gear can accordingly be suppressed from being impeded by the radial direction stopper portion.

Furthermore, the radial direction stopper portion maintains engagement of the worm gear to the wheel gear by stopping radial direction displacement of the worm gear towards the wheel gear radial direction outside. Accordingly dis-engagement of the worm gear from the wheel gear can be prevented.

In the vehicle mirror apparatus of the third exemplary embodiment of the present invention, the axial direction stopper portion stops displacement of the worm gear in the axial direction by the leading end side of the worm gear making contact with the axial direction stopper portion. Consequently, axial direction displacement of the worm gear can be suppressed.

In the vehicle mirror apparatus of the fourth exemplary embodiment of the present invention, the radial direction stopper portion and the axial direction stopper portion are integrated together. Reinforcement of the radial direction stopper portion and the axial direction stopper portion can accordingly be achieved. This enables efficient suppression of radial direction displacement of the worm gear towards the wheel gear radial direction outside, and enables efficient suppression of axial direction displacement of the worm gear.

In the vehicle mirror apparatus of the fifth aspect of the present invention, the suppressing portion is provided on at least one of the face of the worm gear on the axial direction stopper portion side and/or the face of the axial direction stopper portion on the worm gear side, and configuration is made such that when the worm gear has made contact with the axial direction stopper portion the suppressing portion causes a suppressing force to act to suppress the worm gear from radial direction displacement. Radial direction displacement of the worm gear can accordingly be suppressed.

In the vehicle mirror apparatus of the sixth aspect of the present invention, plural of the worm gears, the wheel gears and the radial direction stopper portions are provided In this aspect, the connection portions connect together the plural radial direction stopper portions. Reinforcement of the radial direction stopper portions can accordingly be achieved, and the worm gear can be efficiently suppressed from radial direction displacement towards the wheel gear radial direction outside.

BRIEF DESCRIPTION OF THE DRAWINGS

An exemplary embodiment of the present invention will be described in detail based on the following figures, wherein.

DETAILED DESCRIPTION

Figure 7:
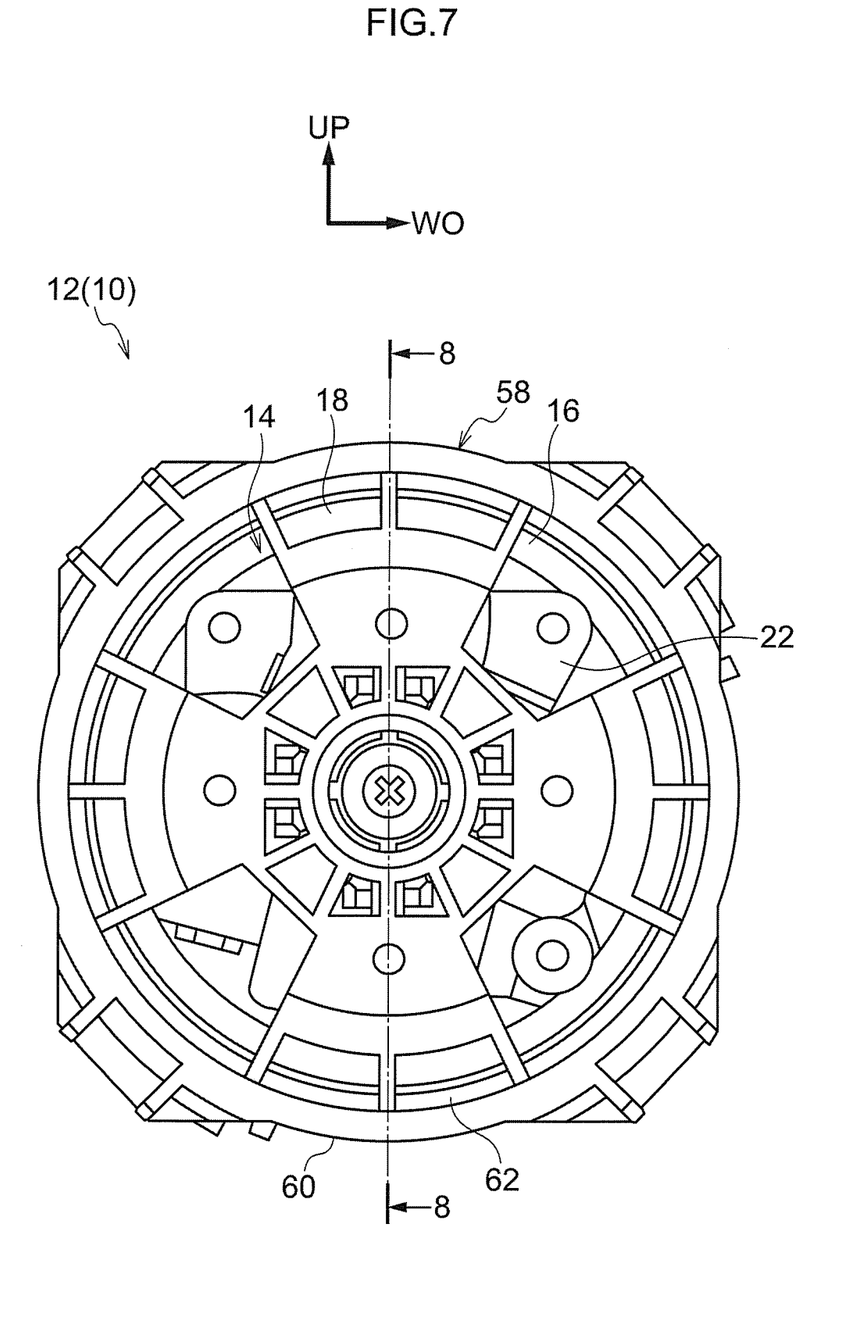
FIG. 7 is a front view illustrating a mirror-face adjustment device of a vehicle door mirror apparatus according to an exemplary embodiment of the present invention, as viewed from the vehicle rear direction.
Figure 8:
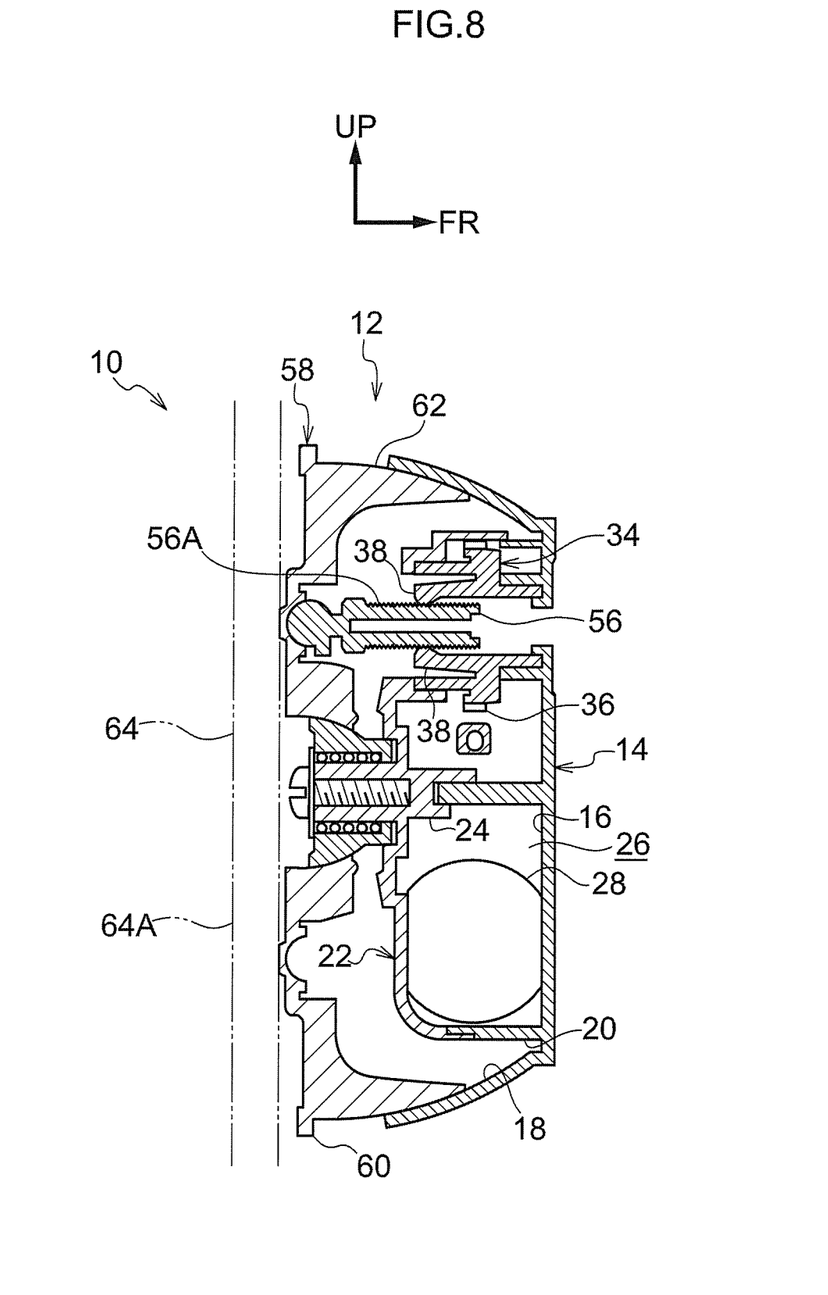
FIG. 8 is a cross-section (cross-section taken on line 8-8 of FIG. 7) illustrating a mirror-face adjustment device of a vehicle door mirror apparatus according to an exemplary embodiment of the present invention, as viewed from a vehicle width direction outside.

FIG. 7 is a front view of main portions of a vehicle door mirror apparatus 10 in which a vehicle mirror apparatus of the present invention is applied, as viewed from a vehicle rear direction. FIG. 8 is a cross-section (a cross-section taken on line 8-8 of FIG. 7) as viewed from the vehicle width direction outside (vehicle right hand side) of main portions of the vehicle door mirror apparatus 10. In the drawings arrow FR indicates the vehicle front direction, arrow WO indicates the vehicle width direction outside, and arrow UP indicates the upward direction.

The vehicle door mirror apparatus 10 according to the present exemplary embodiment is mounted to a vehicle door, with a mirror-face adjustment device 12 (mirror-face angle adjustment device) illustrated in FIG. 7 and FIG. 8 internally provided to the vehicle door mirror apparatus 10.

Figure 1:
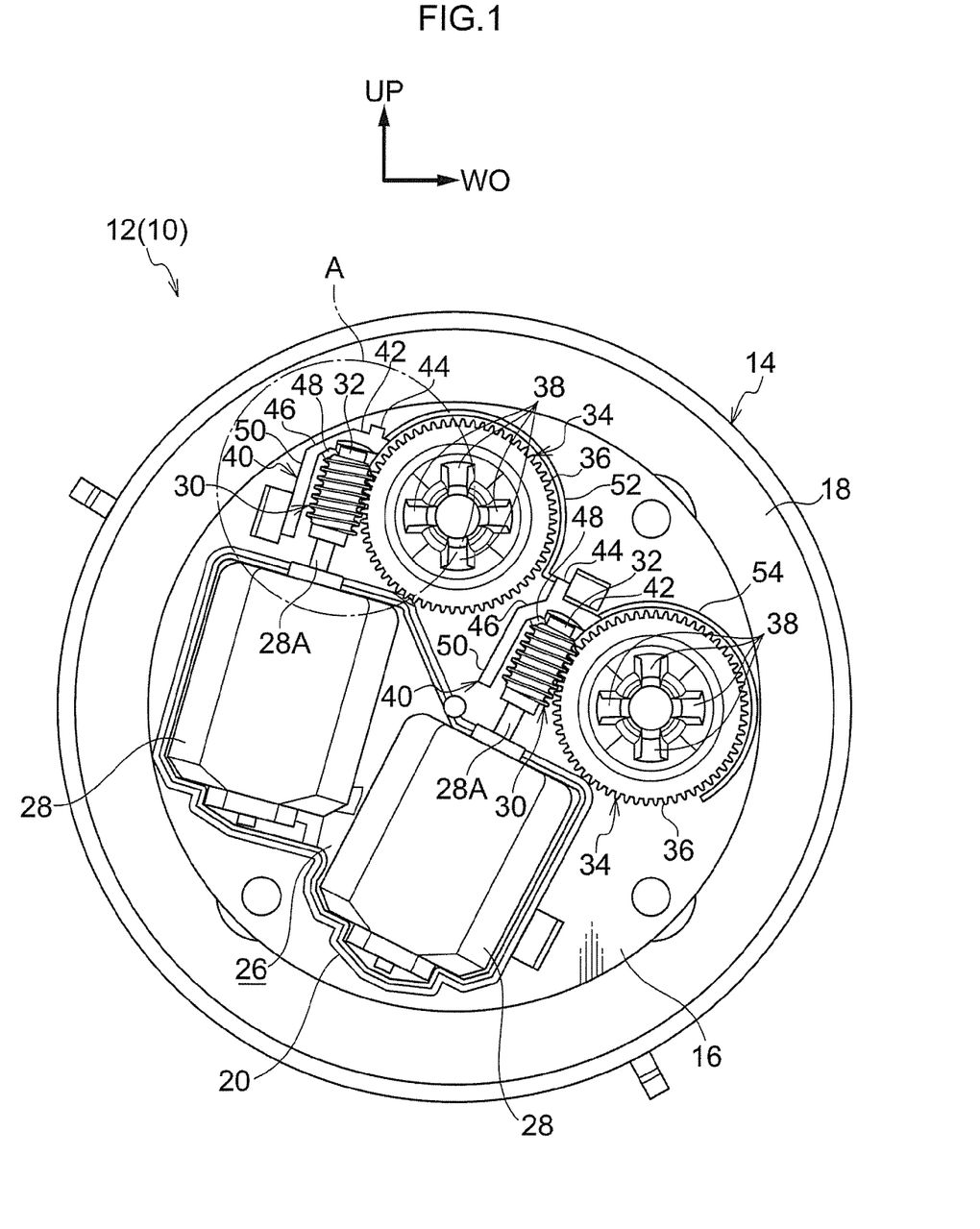
FIG. 1 is a front view illustrating main portions of a mirror-face adjustment device of a vehicle door mirror apparatus according to an exemplary embodiment of the present invention, as viewed from a vehicle rear direction.
Figure 5:
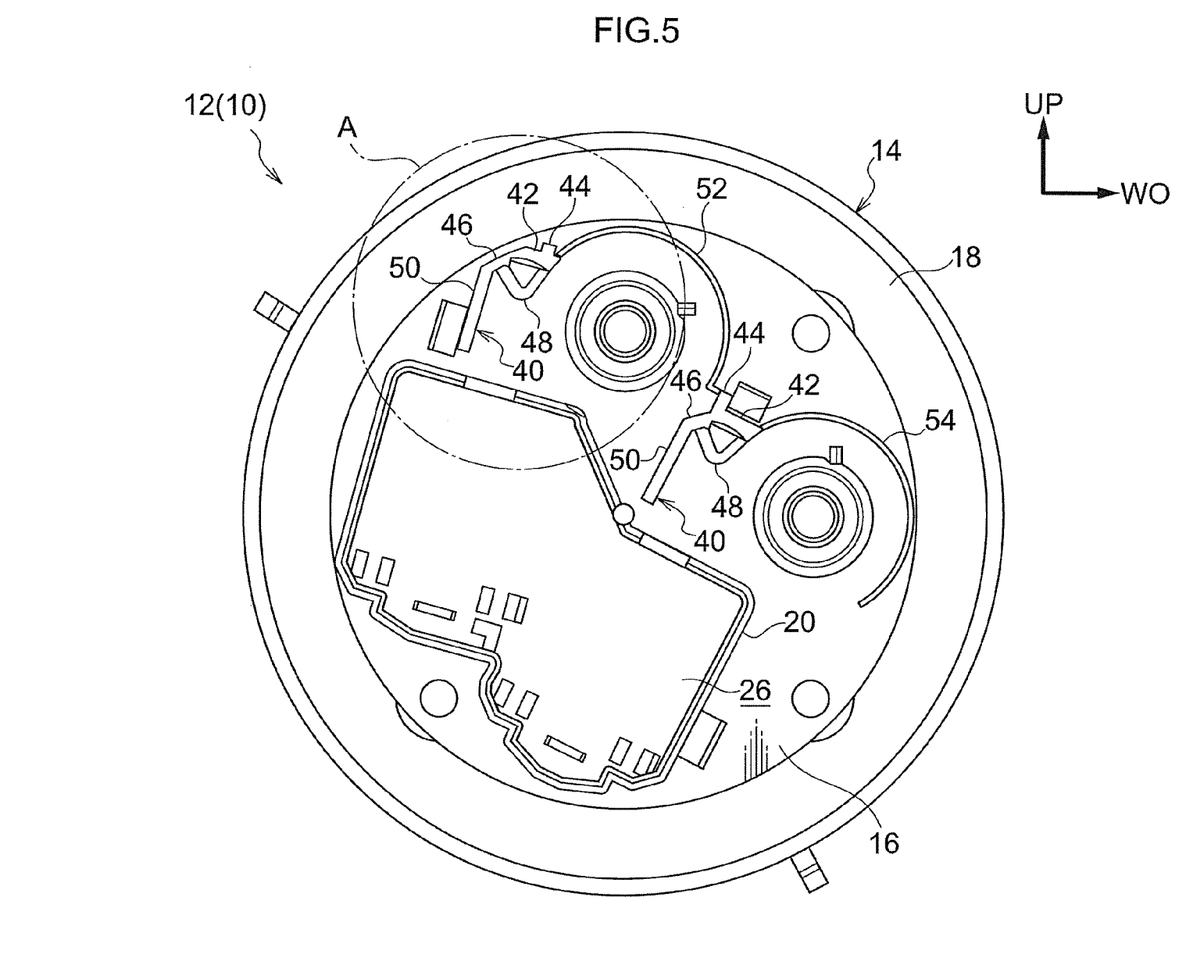
FIG. 5 is a front view illustrating a case of a mirror-face adjustment device of a vehicle door mirror apparatus according to an exemplary embodiment of the present invention, as viewed from a vehicle rear direction.

As shown in FIG. 1 and FIG. 5, the mirror-face adjustment device 12 is provided with a case 14 that serves as a mounting member and is formed from resin in a substantially semi-spherical container shape. The case 14 is fixed at the inside of the vehicle door mirror apparatus 10. The vehicle rear-side face of the case 14 is open, and a vehicle front-side face on the inner peripheral side of the case 14 configures a circular flat plane shaped bottom face 16 disposed perpendicular to the vehicle front-rear direction. The vehicle rear-side face at the inner peripheral side of the case 14 configures a ring shaped pivoting face 18. The pivoting face 18 curves round in a spherical face shape centered on a pivot center of a mirror holder 58, described below. When molding the case 14, a vehicle front-side portion and a vehicle rear-side portion of the case 14 forming mold (not shown in the drawings) are moved in the vehicle front-rear direction (a direction perpendicular to the bottom face 16).

A frame profile housing wall 20 is integrally formed to the bottom face 16 of the case 14. The housing wall 20 projects out from the bottom face 16 towards the vehicle rear-side.

As shown in FIG. 7 and FIG. 8, a substantially container shaped case-inner 22 made from resin and serving as a fixing member is fixed to the bottom face 16 of the case 14. A frame shaped housing frame 24 is integrally formed to the vehicle front-side face of the case-inner 22. The housing frame 24 projects out from the case-inner 22 towards the vehicle front-side. The housing frame 24 is fitted together with the housing wall 20 of the case 14, with a housing space 26 configured between the case-inner 22 and the bottom face 16 of the case 14, at the inside of the housing frame 24 and the housing wall 20.

As shown in FIG. 1 and FIG. 8, a pair of motors 28 serving as drive sections are housed inside the housing space 26. The pair of motors 28 are positioned by the case 14 (including the housing wall 20) and the case-inner 22 (including the housing frame 24), and are fixed inside the housing space 26. An output shaft 28A of each of the motors 28 passes through the housing wall 20 and the housing frame 24 to extend outside the housing space 26. The output shafts 28A are disposed parallel to the bottom face 16 of the case 14, and sliding in the axial direction or tilting in the radial direction is restricted by the motors 28.

A worm gear 30 made from resin is provided to the output shaft 28A of each of the motors 28. The output shaft 28A is coaxially fitted (press fitted) into the worm gear 30 from the base end side (one axial direction side), the worm gear 30 is anchored with respect to the output shaft 28A in the circumferential direction so as to be capable of rotating as one with the output shaft 28A.

Figure 2:
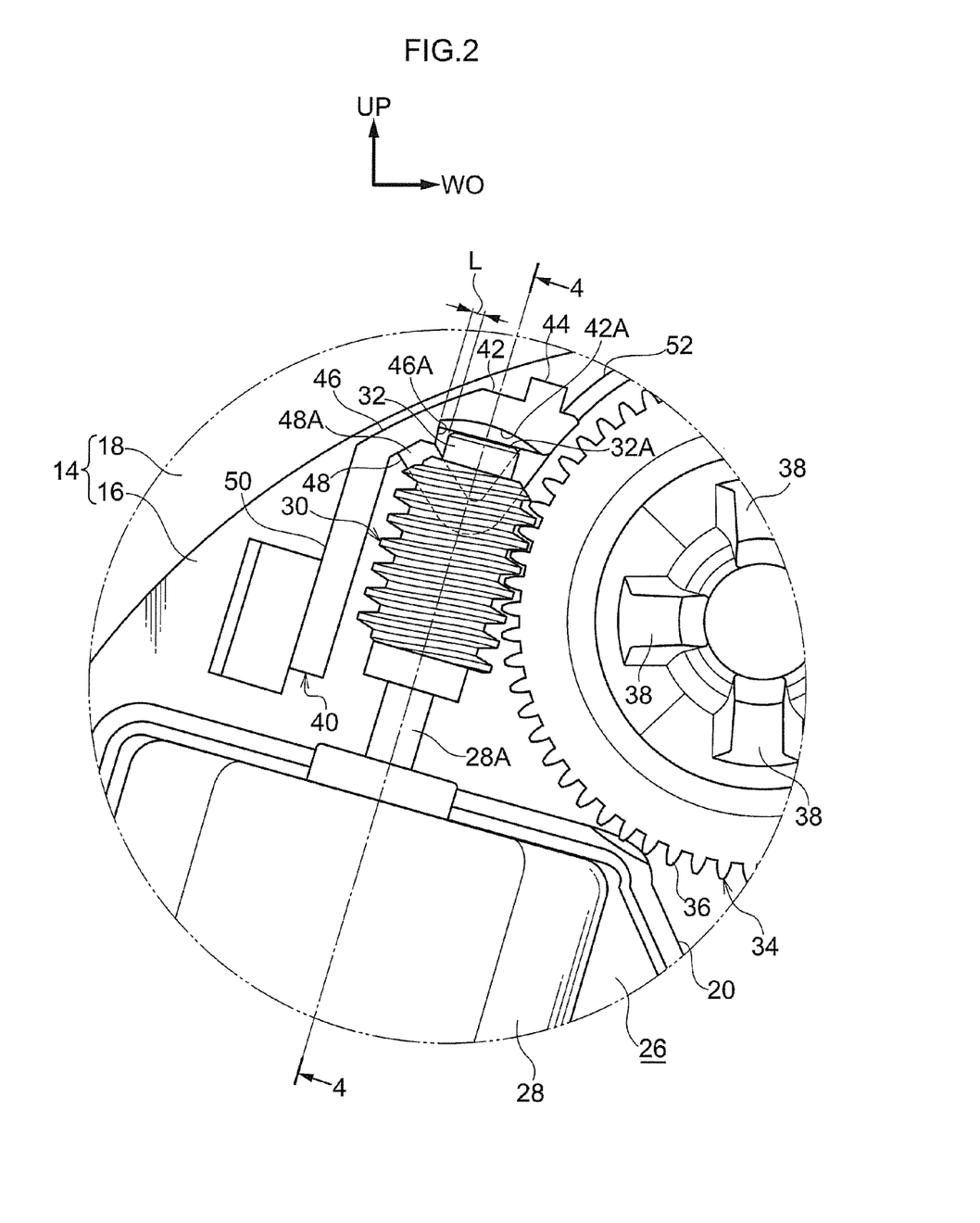
FIG. 2 is an enlarged front view (enlargement of region A in FIG. 1) illustrating main portions of a mirror-face adjustment device in a vehicle door mirror apparatus according to an exemplary embodiment of the present invention, as viewed from the vehicle rear direction.
Figure 3:
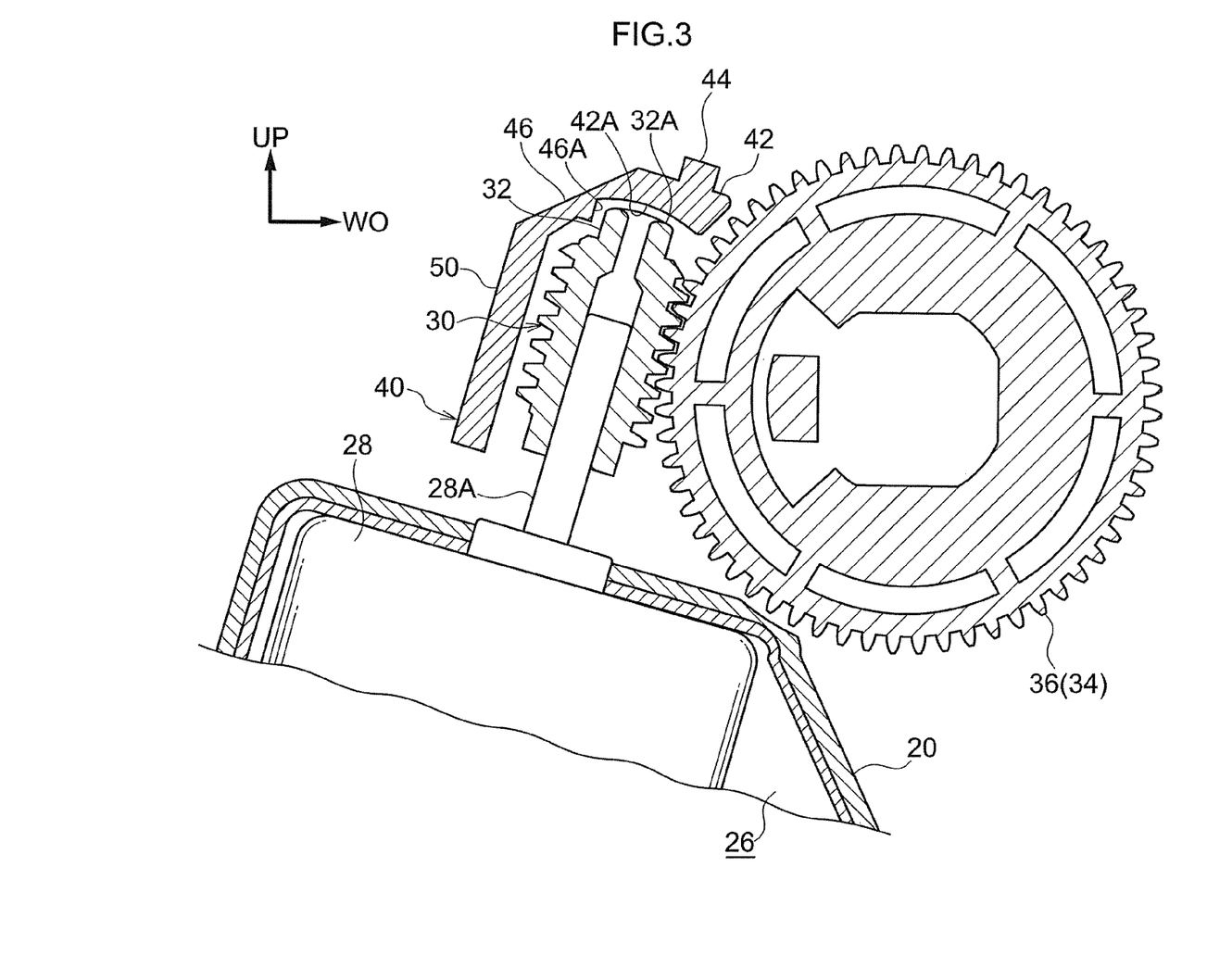
FIG. 3 is an enlarged cross-section (cross-section taken on ling 3-3 in FIG. 4) illustrating main portions of a mirror-face adjustment device in a vehicle door mirror apparatus according to an exemplary embodiment of the present invention, as viewed from the vehicle rear direction.
Figure 4:
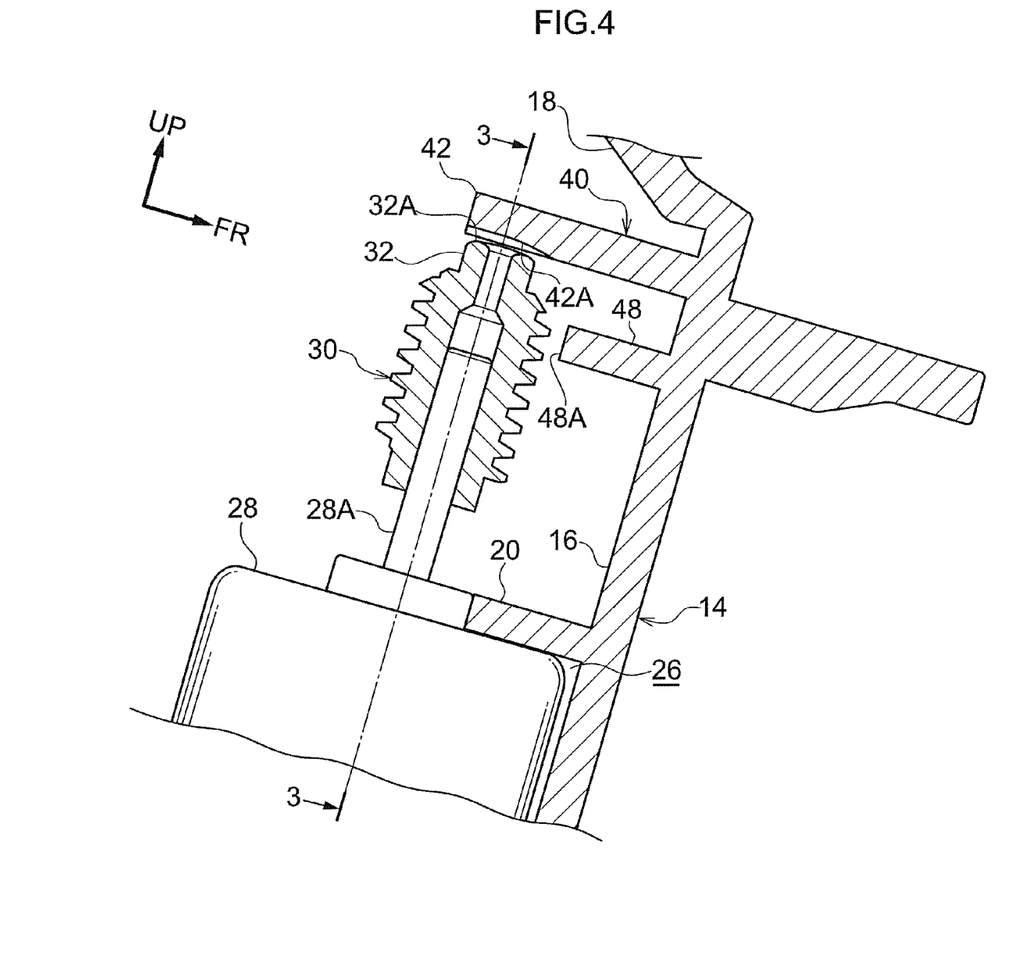
FIG. 4 is an enlarged cross-section (cross-section taken on ling 4-4 in FIG. 2) illustrating main portions of a mirror-face adjustment device in a vehicle door mirror apparatus according to an exemplary embodiment of the present invention, as viewed from a vehicle width direction outside.

As shown in FIG. 2 to FIG. 4, a contact portion 32 with a substantially circular cylindrical top is integrally formed at the leading end portion (a portion at the other axial direction side) of each of the worm gears 30. The contact portion 32 is disposed coaxially to the worm gear 30. The leading end face of the contact portion 32 (the leading end face of the worm gear 30) configures a contact face 32A serving as a suppressing portion. The contact face 32A is curved in a protruding shape, projecting out to the leading end side of the worm gear 30 on progression towards the radial direction inside of the worm gear 30.

An internal hole in the worm gear 30 has a reduced radius in the vicinity of the leading end portion of the worm gear 30, such that sliding (displacing) of the worm gear 30 with respect to the output shaft 28A towards the base end side is stoppable by the output shaft 28A, while sliding of the worm gear 30 with respect to the output shaft 28A towards the leading end side is permitted.

As shown in FIG. 1 and FIG. 8, a pair of substantially circular cylindrical shaped wheel drives 34 made from resin and serving as wheel gears are rotatably supported between the bottom face 16 of the case 14 and the case-inner 22. Movement in the axial direction and the radial direction of each of the wheel drives 34 is restricted by the case 14 and the fitting wall 22. The axial direction of each of the wheel drives 34 is disposed perpendicular to the axial direction of the worm gears 30.

A worm wheel 36 serving as an engagement portion is formed coaxially to each of the wheel drives 34, and each of the worm wheels 36 is meshed (engaged) with the respective worm gear 30. Accordingly, on driving the motors 28 the worm wheels 36 are rotated by drive force (rotational force of the output shaft 28A) from the motors 28, thereby rotating the wheel drives 34.

A specific number (four in the present exemplary embodiment) of meshing claws 38 are integrally formed to each of the wheel drives 34. The specific number of meshing claws 38 are disposed at even intervals around the circumferential direction of the respective wheel drive 34. The meshing claws 38 are resilient and extend out towards the vehicle rear-side of the wheel drives 34. The leading ends (the vehicle rear-side ends) of the meshing claws 38 project out to the radial direction inside of the wheel drives 34.

A pair of L-shaped cross-section shaft bearing walls 40 serving as shaft bearing portions are integrally formed to the bottom face 16 of the case 14. The shaft bearing walls 40 are disposed from the leading end outside of the worm gears 30 and span along the opposite side of the worm gears 30 to the wheel drives 34. The shaft bearing walls 40 are disposed parallel to the axial direction of the wheel drives 34.

As shown in FIG. 2 and FIG. 4, substantially flat plate shaped axial direction shaft bearings 42 are provided as axial direction stopper portions to the shaft bearing walls 40 at the leading end outside of the worm gears 30. The axial direction shaft bearings 42 are integrated to the bottom face 16 of the case 14 and are disposed perpendicular to the axial direction of the wheel drives 34.

The faces of the axial direction shaft bearings 42 on the worm gear 30 side configure axial direction shaft bearing faces 42A serving as suppressing portions (axial direction stopper faces). Each of the axial direction shaft bearing faces 42A face along the axial direction towards the contact face 32A of the respective worm gear 30. The axial direction shaft bearing faces 42A are formed so as to curve around in an indented shape along a face perpendicular to the axis of the wheel drive 34. The depth of indentation of the axial direction shaft bearing faces 42A increases on progression towards the worm gear 30 radial direction inside. As shown in detail in FIG. 4, the vehicle front-side portion of each of the axial direction shaft bearing faces 42A curves around along the vehicle front-rear direction (the axial direction of the wheel drives 34) in an indented shape, and the vehicle front-side portion of each of the axial direction shaft bearing faces 42A has an increasing depth of indention on progression towards the worm gear 30 radial direction inside. The vehicle rear-side portion of each of the axial direction shaft bearing faces 42A is disposed along the vehicle front-rear direction (the axial direction of the wheel drives 34). Accordingly it is possible to move (mold release) the mold for forming the case 14 (including the axial direction shaft bearings 42) towards the vehicle rear direction after the case 14 has been molded. The curved portion of each of the axial direction shaft bearing faces 42A has a smaller radius of curvature than the contact face 32A of the worm gear 30.

Rectangular pillar shaped reinforcement pillars 44 are integrally formed as reinforcement portions to the shaft bearing walls 40 at portions on the opposite side of the axial direction shaft bearings 42 to the worm gears 30. The reinforcement pillars 44 are integrated to the bottom face 16 of the case 14 and reinforce the shaft bearing walls 40 (and in particular the axial direction shaft bearings 42).

Substantially flat plate shaped radial direction shaft bearings 46 are provided as radial direction stopper portions to portions of the shaft bearing walls 40 contiguous to the axial direction shaft bearings 42. The radial direction shaft bearings 46 are integrated to the bottom face 16 of the case 14 and also slope downwards towards the wheel drive 34 radial direction outside on progression towards the base end side of the worm gear 30.

The faces of the radial direction shaft bearings 46 on the worm gear 30 side configure flat plane shaped radial direction shaft bearing faces 46A serving as radial direction stopper faces. The radial direction shaft bearing faces 46A are disposed parallel to the axial direction of the worm gear 30 and to the axial direction of the wheel drives 34. In a state in which each of the radial direction shaft bearing faces 46A face, but are separated from, the peripheral face of the contact portion 32 of the respective worm gear 30 along the worm gear 30 radial direction, the minimum separation distance between the radial direction shaft bearing faces 46A and the peripheral face of the contact portion 32 is the separation distance L shown in FIG. 2.

Figure 6:
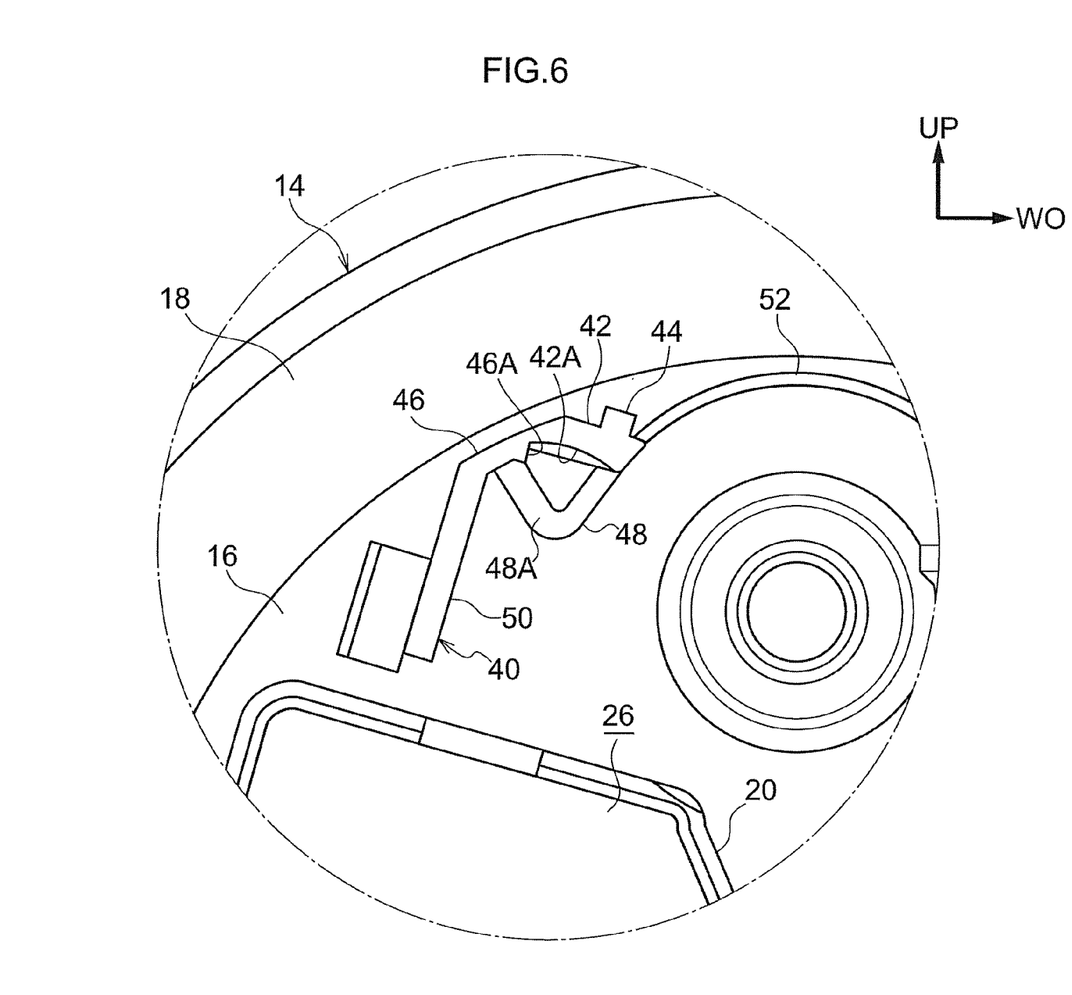
FIG. 6 is an enlarged front view (enlargement of region A in FIG. 5) illustrating a case of a mirror-face adjustment device of a vehicle door mirror apparatus according to an exemplary embodiment of the present invention, as viewed from the vehicle rear direction.

As shown in FIG. 5 and FIG. 6, V-profile wall cross-section shaped stopper walls 48 are integrally formed as stopper portions and reinforcement portions to the shaft bearing walls 40 at the vehicle front-side of the worm gears 30. The stopper walls 48 are integrated to the bottom face 16 of the case 14, and a stopper face 48A on the leading end (the vehicle rear-side) of each of the stopper walls 48 faces the leading end side portion of each of the worm gears 30 along the vehicle front-rear direction (the wheel drive 34 axial direction) in a separated state (see FIG. 4). The two ends of each of the stopper walls 48 are connected to the axial direction shaft bearings 42 and the radial direction shaft bearings 46, respectively. The stopper walls 48 reinforce the shaft bearing walls 40 (and in particular the axial direction shaft bearings 42 and the radial direction shaft bearings 46). Portions of the stopper walls 48 on the radial direction shaft bearing 46 side are disposed perpendicular to the radial direction shaft bearings 46.

As shown in FIG. 2 to FIG. 4, elongated flat plate shaped reinforcement walls 50 are provided to the shaft bearing walls 40 as reinforcement portions on the opposite side of the radial direction shaft bearings 46 to the axial direction shaft bearings 42. The reinforcement walls 50 are integrated to the bottom face 16 of the case 14 and are disposed parallel to the respective worm gear 30 axial direction.

As shown in FIG. 1 and FIG. 5, substantially semi-circular cylindrical shaped connection walls 52, 54 are integrally formed to the bottom face 16 of the case 14. The connection walls 52, 54 are disposed parallel to the axial direction of the wheel drives 34. The connection wall 52 is disposed at the outside periphery of one of the wheel drives 34 and connects together the axial direction shaft bearing 42 of one of the shaft bearing walls 40 to the reinforcement pillar 44 of the other shaft bearing wall 40. The one connection wall 52 functions as a connection portion and reinforces the pair of shaft bearing walls 40 (in particular the axial direction shaft bearings 42). The other connection wall 54 is disposed at the outside periphery of the other wheel drive 34 and is connected to the axial direction shaft bearing 42 of the other shaft bearing wall 40. The other connection wall 54 reinforces the other shaft bearing wall 40 (in particular the axial direction shaft bearing 42).

As shown in FIG. 8, a substantially circular shaft shaped rod drive 56 serving as a drive member is inserted inside each of the wheel drives 34 and rotation of the wheel drives 34 about the respective rod drive 56 axis is restricted. One of the wheel drives 34 is disposed above the central axis of the pivoting face 18 of the case 14 (configuration may also be made below), and the other of the wheel drives 34 is disposed to the vehicle width direction outside of the central axis of the pivoting face 18 (configuration may be made to the inside in the vehicle width direction).

Portions of each of the rod drives 56 other than the leading end portion (the vehicle rear-side end portion) configure a screw 56A, and the leading ends of the meshing claws 38 of the wheel drives 34 mesh (engage) with the screw 56A. Accordingly by driving the motors 28 to rotate the wheel drives 34 (including the meshing claws 38), as described above, the meshing position of the leading end of the meshing claws 38 with each of the screws 56A is displaced, and the rod drive 56 is moved in the vehicle front-rear direction.

As shown in FIG. 7 and FIG. 8, the mirror holder 58 serving as a retaining member is provided at the vehicle rear-side of the case 14. A substantially circular plate shaped holder portion 60 is formed at a portion on the vehicle rear-side end of the mirror holder 58. The center of the holder portion 60 is retained on the case-inner 22 so as to be capable of pivoting, and accordingly the mirror holder 58 is retained by the case-inner 22 so as to be capable of pivoting.

The holder portion 60 is retained by a leading end portion (a portion at the vehicle rear-side end) of each of the rod drives 56 so as to be capable of pivoting. By driving the motors 28 as described above, the rod drives 56 are respectively moved in the vehicle front-rear direction, thereby driving and pivoting the mirror holder 58. Pivoting of the mirror holder 58 is stopped when the holder portion 60 makes contact with the vehicle rear-side end face of the case 14.

A substantially semi-spherical wall shaped pivot wall 62 is integrally formed to the vehicle front-side face of the holder portion 60. The vehicle front-side face of the pivot wall 62 is open. The pivot wall 62 curves around in a spherical shape centered on the pivot center of the mirror holder 58. The pivot wall 62 makes contact with (is pressed by) the pivoting face 18 of the case 14. Accordingly, the pivot wall 62 is slid along the pivoting face 18 by the mirror holder 58 pivoting.

A mirror 64 is retained to the vehicle rear-side of the holder portion 60, with the mirror 64 capable of pivoting (tilting) as one with the mirror holder 58. A mirror face 64A disposed on the vehicle rear-side of the mirror 64 enables a vehicle occupant to view towards the vehicle rear-side.

Explanation follows regarding operation of the exemplary embodiment.

For the vehicle door mirror apparatus 10 configured as described above, driving the motors 28 in the mirror-face adjustment device 12 rotates the worm gears 30 with driving force from the motors 28 (rotation of the output shafts 28A). The respective wheel drive 34 (including the worm wheel 36 and the specific number of the meshing claws 38) is thereby rotated, moving the rod drive 56 in the vehicle front-rear direction. The mirror holder 58 and the mirror 64 are accordingly pivoted by the rod drive(s) 56 in at least one of the up-down direction and/or the vehicle width direction, thereby adjusting the angle of the mirror face 64A of the mirror 64 in at least one of the up-down direction and/or the vehicle width direction.

Pivoting of the mirror holder 58 stops due to the holder portion 60 of the mirror holder 58 making contact with the vehicle rear-side end face of the case 14 when the motors 28 have been driven, and pivoting of the mirror 64 also stops. Accordingly, at a rotation rest (stopped) state of the wheel drives 34, since rotation force due to driving force of the motors 28 acts on the worm gears 30, tilting force (displacement force) acting on the worm gear 30 in the radial direction towards the radial direction outside of the wheel drives 34 increases.

Here, the peripheral face of the contact portion 32 of each of the worm gears 30 is separated in the worm gear 30 radial direction from both the radial direction shaft bearing face 46A of the radial direction shaft bearing 46 on the shaft bearing wall 40 and from the stopper face 48A of the stopper wall 48 on the bottom face 16 of the case 14. Radial direction tilting of the worm gear 30 is thereby permitted by the radial direction shaft bearing 46 (the radial direction shaft bearing face 46A) and by the stopper wall 48 (the stopper face 48A). Consequently, when the motors 28 are driven and the mirror 64 is pivoted (during normal operation of the mirror-face adjustment device 12), the radial direction shaft bearings 46 (the radial direction shaft bearing faces 46A) and the stopper walls 48 (the stopper faces 48A) can be suppressed from impeding rotation of the worm gears 30.

Furthermore, by the peripheral face of the contact portion 32 of each of the worm gears 30 making contact with the radial direction shaft bearing face 46A of the radial direction shaft bearing 46, in particular when pivoting of the mirror 64 has been stopped, radial direction tilting of the worm gear 30 towards the wheel drive 34 radial direction outside is stopped by the radial direction shaft bearing 46 (the radial direction shaft bearing face 46A). The worm gear 30 can accordingly be prevented from radial direction tilting towards the wheel drive 34 radial direction outside. Accordingly, the meshing depth of the worm gear 30 with the wheel drives 34 (the worm wheel 36) can be suppressed from becoming smaller (varying), and the operation noise from the mirror-face adjustment device 12 can be suppressed from becoming louder.

The operation noise from the mirror-face adjustment device 12 rises abruptly when meshing depth of the worm gears 30 to the wheel drives 34 (the worm wheels 36) becomes a meshing depth of a specific value or less, even though meshing of the worm gears 30 to the wheel drives 34 (the worm wheels 36) is maintained. Accordingly, by making the minimum separation distance between the peripheral face of the contact portions 32 of the worm gears 30 and the radial direction shaft bearing faces 46A of the radial direction shaft bearings 46 the separation distance L shown in FIG. 2, when the radial direction shaft bearings 46 (the radial direction shaft bearing faces 46A) have prevented the worm gears 30 from radial direction tilting towards the wheel drive 34 radial direction outside, not only is meshing of the worm gears 30 to the wheel drives 34 (the worm wheels 36) maintained, but the meshing depth of the worm gears 30 to the wheel drives 34 (the worm wheels 36) is also caused to remain at greater than a specific value. Accordingly not only un-meshing of the worm gears 30 from the wheel drives 34 (the worm wheel 36)

can be prevented, but the operation noise of the mirror-face adjustment device 12 can also be efficiently suppressed from become louder.

Furthermore, due to portions at the leading end side of the worm gears 30 making contact with the stopper faces 48A of the stopper walls 48, particular when pivoting of the mirror 64 has been stopped as described above, radial direction tilting of the worm gears 30 in the wheel drive 34 axial direction is stopped by the stopper walls 48 (the stopper faces 48A). The worm gear 30 can accordingly be suppressed from radial direction tilting in the wheel drive 34 axial direction, the meshing depth of the worm gears 30 with the wheel drives 34 (the worm wheels 36) can be even better suppressed from becoming smaller (varying), and the operation noise of the mirror-face adjustment device 12 can be even better suppressed from becoming louder.

By making each of the contact faces 32A of the contact portions 32 of the worm gears 30 contact the respective axial direction shaft bearing face 42A of the axial direction shaft bearing 42 of the shaft bearing wall 40 at the bottom face 16 of the case 14, sliding (displacement) of the worm gear 30 towards the opposite side to the motors 28 is stopped by the axial direction shaft bearing 42 (the axial direction shaft bearing face 42A). The worm gear 30 can hence be suppressed from sliding in the axial direction towards the opposite side to the motors 28.

Each of the contact faces 32A of the worm gear 30 is also curved in a protruding shape, and each of the axial direction shaft bearing faces 42A of the axial direction shaft bearings 42 is curved in an indented shape. Accordingly, when each of the contact faces 32A of the worm gears 30 makes contact with the respective axial direction shaft bearing face 42A of the axial direction shaft bearing 42, suppressing force acts to suppress radial direction tilting of the worm gear 30. Radial direction tilting of the worm gears 30 can accordingly be automatically suppressed, and meshing depth of the worm gears 30 to the wheel drives 34 (the worm wheels 36) can be automatically suppressed from varying, and operation noise of the mirror-face adjustment device 12 can be suppressed from becoming louder.

The radial direction shaft bearings 46, the stopper walls 48 and the axial direction shaft bearings 42 are also integrated together, and reinforce each other. The radial direction shaft bearings 46, and the stopper walls 48 and the axial direction shaft bearings 42 are also reinforced by the reinforcement pillars 44 and the reinforcement walls 50. Accordingly, radial direction tilting of the worm gears 30 towards the wheel drive 34 radial direction outside can be suppressed even more effectively, radial direction tilting of the worm gears 30 towards the axial direction of the wheel drives 34 can be suppressed even more effectively, and the worm gears 30 can be suppressed even more effectively from siding in the axial direction towards the opposite side to the motors 28.

One of the shaft bearing walls 40 and the other of the shaft bearing walls 40 are also connected together by the one connection wall 52, and the one shaft bearing wall 40 (the radial direction shaft bearing 46, the stopper wall 48 and the axial direction shaft bearing 42) reinforces the other shaft bearing wall 40 (the radial direction shaft bearing 46, the stopper wall 48 and the axial direction shaft bearing 42). The other connection wall 54 is also connected to the other shaft bearing wall 40, reinforcing the other shaft bearing wall 40 (the radial direction shaft bearing 46, the stopper wall 48 and the axial direction shaft bearing 42). Accordingly, radial direction tilting of the worm gears 30 towards the wheel drive 34 radial direction outside can be even more effectively suppressed, radial direction tilting of the worm gears 30 in the wheel drive 34 axial direction can be even more effectively suppressed, and the worm gears 30 can be even more effectively suppressed from sliding in the axial direction towards the opposite side to the motors 28.

Furthermore, as described above, due to the radial direction shaft bearings 46, the stopper walls 48 and the axial direction shaft bearings 42 being reinforced, noise arising due to vibration of the radial direction shaft bearings 46, the stopper walls 48 and the axial direction shaft bearings 42 can also be suppressed from occurring.

Note that in the present exemplary embodiment the contact faces 32A of the worm gears 30 are each curved in a protruding shape, and the axial direction shaft bearing faces 42A of the axial direction shaft bearings 42 are each curved in an indented shape. However, configuration may be made with the contact faces 32A of the worm gears 30 each configured with an indented shape, and the axial direction shaft bearing faces 42A of the axial direction shaft bearings 42 each configured with a protruding shape. Configuration may also be made in which one of the contact faces 32A of the worm gears 30 and one of the axial direction shaft bearing faces 42A of the axial direction shaft bearings 42 is configured with an indented shape, and the other of the contact faces 32A of the worm gears 30 and the other of the axial direction shaft bearing faces 42A of the axial direction shaft bearings 42 is configured in a protruding shape.

Whereas in the present exemplary embodiment the present invention is applied to the vehicle door mirror apparatus 10, configuration may also be made with the present invention applied to another external or internal vehicle mirror apparatus.

What is claimed is:

1. A vehicle mirror apparatus comprising: a mirror provided to a vehicle; a worm gear connected to an output shaft of a drive section, the worm gear being rotated by driving force from the drive section; a wheel gear engaged with the worm gear, the wheel gear adjusting a mirror-face angle of the mirror by being rotated due to the worm gear rotating; and a radial direction stopper portion that stops displacement of the worm gear in a radial direction of the worm gear towards a radial direction outside of the wheel gear by the leading end side of the worm gear making contact with the radial direction stopper portion.

2. The vehicle mirror apparatus of claim 1, wherein the radial direction stopper portion includes a radial direction stopper part which is configured such that the leading end side of the worm gear is able to make contact with the radial direction stopper part, the radial direction stopper part being separated by a distance from the leading end side of the worm gear in the radial direction of the worm gear such that the radial direction stopper portion permits displacement of the worm gear in the radial direction of the worm gear towards the radial direction outside of the wheel gear, and the distance is set such that engagement of the worm gear to the wheel gear is maintained when the radial direction stopper part stops displacement of the worm gear in the radial direction of the worm gear towards the radial direction outside of the wheel gear by making contact with the leading end side of the worm gear.

3. The vehicle mirror apparatus of claim 1, further comprising an axial direction stopper portion that stops displacement of the worm gear in an axial direction of the worm gear by the leading end side of the worm gear making contact with the axial direction stopper portion.

4. The vehicle mirror apparatus of claim 3, wherein the radial direction stopper portion and the axial direction stopper portion are integrated together.

5. The vehicle mirror apparatus of claim 3, further comprising a suppressing portion that is provided on at least one of the face of the worm gear on the axial direction stopper portion side and the face of the axial direction stopper portion on the worm gear side, and is configured such that when the worm gear has made contact with the axial direction stopper portion the suppressing portion causes suppressing force to act to suppress displacement of the worm gear in the radial direction of the worm gear.

6. The vehicle mirror apparatus of claim 1, wherein pluralities of the worm gears, the wheel gears and the radial direction stopper portions are provided, and the vehicle mirror apparatus further comprising a plurality of connection portions that connect together the plurality of radial direction stopper portions.

7. The vehicle mirror apparatus of claim 1, wherein the drive section is a motor.

8. The vehicle mirror apparatus of claim 2, wherein the drive section is a motor.

* * * * *